United States Patent Office 3,752,676
Patented Aug. 14, 1973

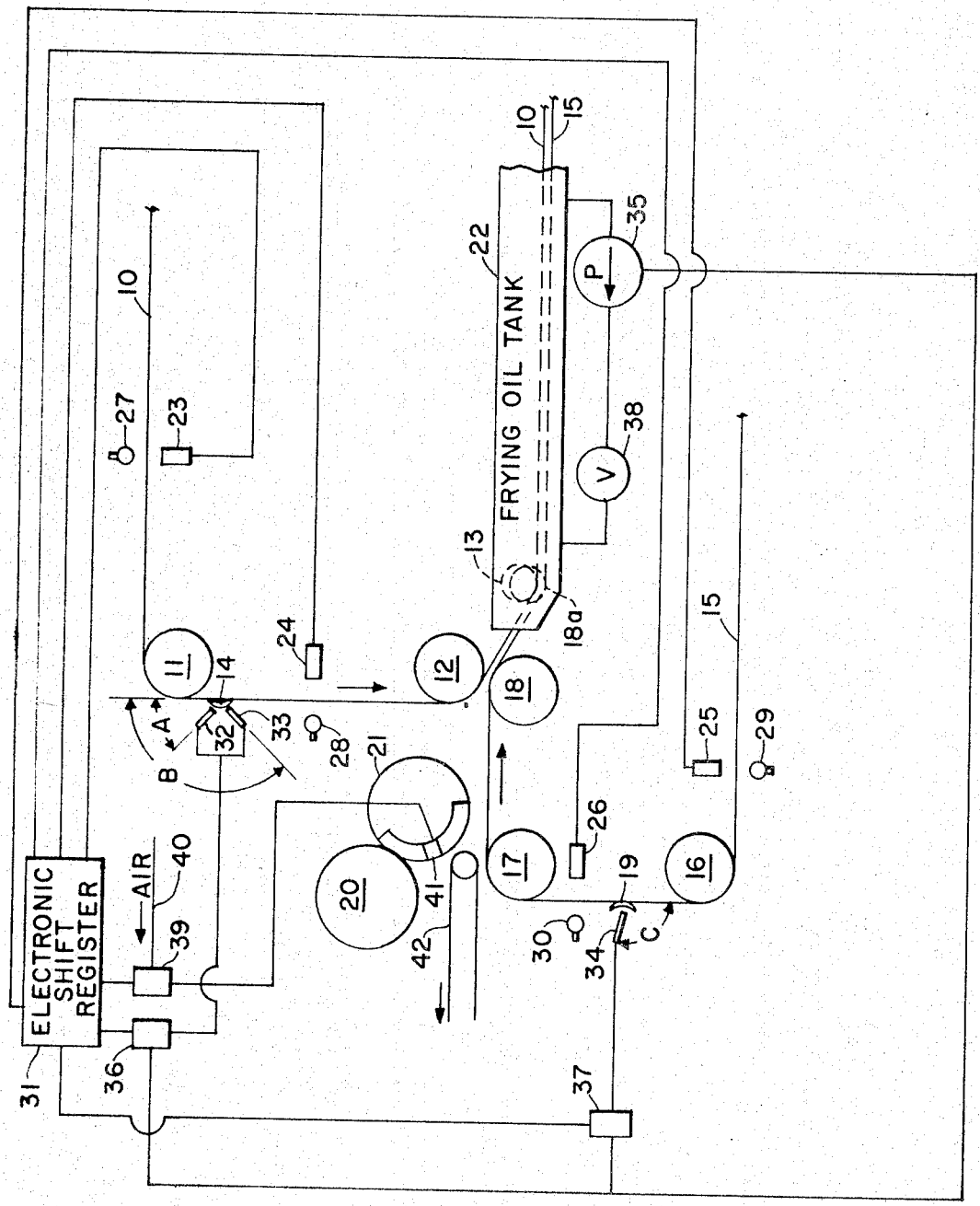

3,752,676
PHOTOSENSE DETECTING AND REMOVING STUCK CHIPS FROM A CARRIER OF A CHIP FRYING MACHINE
John E. Callaham, Columbia, Mo., assignor to The Procter & Gamble Company, Cincinnati, Ohio
Filed Nov. 15, 1971, Ser. No. 198,621
Int. Cl. A23l 1/00
U.S. Cl. 99—100 P                     6 Claims

ABSTRACT OF THE DISCLOSURE

A method of detecting and removing chips, e.g. potato chips, made from an edible dough after being fried in a hot oil bath in those few instances where the chips remain stuck to their individual carrier members and are not readily removable by conventional means. The method contemplates the provision of an electric photo sensor to detect a stuck chip through the blockage of openings in the carrier member and signalling an electronic shift register. One or more nozzles for discharging oil at high pressure are positioned over the path of travel of the carrier members beyond the electric photo sensor. A solenoid valve is operated by the shift register in timed sequence with the movement of the stuck chip in order to discharge oil from the nozzle against the stuck chip during passage beneath the nozzle. The struck chip is stripped from the carrier member in this fashion. A second electric photo sensor detects whether the stuck chip has been stripped off. If not, a signal is transmitted to the electronic shift register which then prevents deposit of a raw dough piece on any chip carrier in which either member of the pair has a stuck chip clinging thereto. This prevents the deposit and build up of stuck chips on any given carrier member until removed on successive cycles of the machine.

BACKGROUND OF THE INVENTION

This invention relates broadly to the field of fried snack-type chips, e.g. potato chips, prepared from an edible dough. More particularly, it was devised as a method of controlling and preventing damage to the carrier elements of a Chip Frying Machine of the type disclosed and claimed in U.S. Pat. 3,520,248 issued to Robert G. MacKendrick on July 14, 1970 or to an Apparatus for Preparing Chip-Type Products such as disclosed and claimed in U.S. Pat. 3,608,474 issued to Alexander L. Liepa on Sept. 28, 1971. Both of the cited patents are assigned to and commonly owned by the assignee of the present invention.

Machines such as those shown and described in the MacKendrick and Liepa patents can be generally characterized as being well suited for the making of a chip-type product, preferably potato chips, from an edible dough. This is accomplished by feeding a thin dough sheet into the machine whereupon individual dough sections are cut from the sheet each of which are deposited on one of a co-acting pair of shaped perforated dough carrier members. The other member of the pair is then moved into contiguous relationship with the first member thereby enclosing the cut dough piece between the pair of carrier members. The opposed surfaces of the carrier members are uniformly spaced throughout their areas to hold and restrain the dough piece as it is carried through the processing operation. The carrier members move the dough piece through a tank containing hot frying oil thereby frying the dough piece and transforming it into a crisp, chip-type product whereupon the carrier members are separated and the finished chip is removed.

It has been found in the operation of such machines, that a fried chip will occasionally tend to stick to one of the two carrier members of the pair. This causes certain operational problems since the machine is designed to automatically deposit a fresh cut dough piece on one of the carrier members during each cycle. Thus, additional thicknesses of dough and fried chips tend to build up and ultimately cause significant stresses on the carrier members leading to damage to one or both of the carrier members of any given pair. It will be apparent, of course, that in a continuously operating high speed production machine this type of problem is preferably avoided.

SUMMARY OF THE INVENTION

The nature and substance of the invention will be more readily appreciated after giving consideration to its major aims and purposes. The principal objects of the invention are recited in the ensuing paragraphs in order to provide a better appreciation of its important aspects prior to describing the details of a preferred embodiment in later portions of this description.

A major object of the invention is the provision of a method of detecting and removing stuck chips from one of a pair of carrier members of a chip frying machine.

Another object of the invention is the provision of an automatic method of removing a stuck chip from a carrier member which allows the carrier to be cleaned inside the processing machine without stopping or entering the machine to effect the removal.

Still another object of the invention is a method of detecting and removing stuck chips which is particularly adapted for use in a chip frying machine which employs frying oil discharged at high velocity through a cleaning nozzle to strip away stuck chips at an appropriate time in the cycle of movement of the chip carrier member.

These and other objects are achieved by providing a method of detecting and removing stuck chips from either one of a pair of chip carrier members of a chip frying machine which includes the steps of detecting for the presence of a stuck chip in the path of travel of either chip carrier member by the use of an electric photo sensor and transmitting a signal to an electronic shift register upon sensing the presence of a stuck chip. The electronic shift register is used for controlling the discharge of a high pressure jet of oil from a nozzle against the stuck chip to remove it from the chip carrier, the discharge being coordinated with the movement of the stuck chip so that the oil is discharged only during the time interval that the stuck chip moves beneath the nozzle. A second electric photo sensor is mounted for scanning the chip carrier beyond the nozzle to determine the presence of any remaining stuck chip and transmitting a signal to the shift register upon sensing the continued presence of a stuck chip. The shift register is used for actuating a reject blowoff to prevent the deposit of a fresh raw dough piece on any chip carrier upon which either member of the pair has a stuck chip clinging thereto.

BRIEF DESCRIPTION OF THE DRAWING

While the specification concludes with claims particularly pointing out and distinctly claiming the subject matter regarded as forming the present invention, it is believed the invention will be better understood from the following description taken in connection with the accompanying drawing in which:

The drawing comprises a schematic illustration of the relevant parts of the chip frying machine and the control and removal components incorporated therein for carrying out the method of the present invention.

DESCRIPTION OF THE PREFERRED EMBODIMENT

The invention has particular utility in detecting and thereafter removing stuck chips on a machine of the type described in the patent of Robert G. MacKendrick previously cited in that portion of the application under the heading "Background of the Invention." For convenience, the following description of a preferred embodiment has been made in the context of applying the invention to a machine as described in the MacKendrick patent. A detailed description of the machine itself will not be made herein as the MacKendrick patent teaches such details and its disclosure is incorporated herein by reference.

The chip frying machine with which the present invention is particularly useful includes an endless chain 10 running over the sprockets 11, 12 and 13, it being understood that the chain 10 is preferably one of two chains provided in matched pairs. A plurality of upper carrier members 14 are supported by and attached to the endless chain 19 in closely spaced relationship. Similarly, an endless chain 15 is provided running over the sprockets 16, 17, 18 and 18a. The endless chain 15 is preferably one of two chains in matched pairs for the purpose of supporting rows of lower carrier members 19 which are moved along in unison with the upper carrier members 14. As will be appreciated by making reference to the MacKendrick patent, the upper and lower carrier members 14 and 19, respectively, are preferably saddle-shaped mold members each provided with a plurality of apertures distributed uniformly over their surfaces. Additional structural details of their characteristics can be obtained by making reference to that patent.

The raw dough is fed from a pair of conventional sheeting rolls (not shown) between the cutter roll 20 and transfer roll 21. Individual cut dough pieces are cut from the dough sheet by the cutter roll 20 whereupon they are held on the transfer roll 21 by vacuum and ultimately removed and deposited on each of the lower carrier members 19 by air pressure which forces the individual cut dough pieces away from the transfer roll 21 for deposit on each of the lower carrier members 19. As the carrier member 19 with a cut dough piece thereon moves forward, it moves into juxtaposition with an upper carrier member 14 such that the cut dough piece is interposed therebetween. Thereupon the carrier pair moves the cut dough piece through an enclosed elongated frying tank 22 containing a hot frying oil at a temperature of from about 275° to about 400° F., preferably 340° F. As the raw dough piece moves through the tank 22, it is cooked to become an edible chip. It will be understood that the frying oil in the tank 22 is preferably blanketed with inert gas to minimize oxidation of the frying oil. Upon being fried, the upper and lower carrier members 14 and 19 separate whereupon the finished chip is removed for further handling and ultimate packaging.

The present method is designed to detect the presence of those chips that have been fried but which are not readily removed from one of the carrier members and are thereby characterized as stuck chips. Such chips can, on occasion, be stuck either to the upper carrier 14 or the lower carrier 19. It has been found desirable to detect such chips and remove them prior to the passage of the lower carrier member 19 beneath the transfer roll 21 in order to prevent deposit of another raw dough piece thereon. Such deposit would further complicate the problem of removing the original stuck chip inasmuch as the second and succeeding dough pieces are fried and tend to become adhered to the first stuck chip. As the stuck chips build up this can cause additional stresses leading to failures in the machine and in particular to failure in the carrier elements themselves.

To this end, the present method provides electric photo sensors 23, 24, 25, 26 which receive light from the sources 27, 28, 29 and 30, respectively. Light from the sources 27, 28, 29 and 30 is transmitted through the apertures in the carrier members 14 and 19, respectively, and is sensed by the electric photo sensors 23, 24, 25 and 26, respectively. Should a stuck chip be present on either of the carrier members 14 or 19, this light is obstructed to the electric photo sensor and this causes a signal to be transmitted to the electronic shift register 31 which can be characterized as a conventional commercially available memory device such as those that are well known to those skilled in the art.

The removal of stuck chips is, in fact, carried out by a high pressure oil jet from the nozzles 32 and 33 for the upper carrier members 14 and by a similar oil jet from the nozzle 34 for the lower carrier members 19. The high pressure nozzles are supplied with hot frying oil from the tank 22 by means of the high pressure pump 35 through the normally closed solenoid valves 36 and 37, respectively, each of which is individually controlled from the electronic shift register 31. Inasmuch as the solenoid valves 36 and 37 are normally closed, it is desirable to provide a balanced piston type relief valve 38 in order to bypass high pressure oil from the pump 35 back into the tank 22 since the solenoid valves 36 and 37 will only be open for very short intervals with comparatively long periods of inaction interposed.

Similarly, a normally closed solenoid air valve 39 is provided to admit air under pressure from the line 40 which is supplied from a suitable source (not shown) to the chamber 41. This permits the ejection of a raw dough piece and blows it off onto the scrap return conveyor 42 on signal from the electronic shift register 31 opening the solenoid air valve 39 for a short time interval. The purpose of this latter step will become apparent as the operative cycle is described.

The operation of the system will now be described. As successive carriers members 14 pass the electric photo sensor 23, they will normally be clean thereby passing light through their apertures. Upon the passage of a carrier 14 having a stuck chip thereon, a signal will be transmitted by the electric photo sensor 23 to the electronic shift register 31. The shift register 31 has a memory so that upon arrival of the stuck chip from the photo sensor 23, beneath the nozzles 32 and 33, oil is discharged from the nozzles 32 and 33 but only during passage of the stuck chip therebeneath. This is effected by the electronic shift register 31 which opens the solenoid valve 36 to allow the pump 35 to deliver frying oil from the tank 22 at high pressure thereby stripping the stuck chip from the carrier 14.

In order to check on the removal of the chip, a second electric photo sensor 24 is provided for the detection of stuck chips in much the same manner as the photo sensor 23 such that a signal is transmitted from the photo sensor 24 to the electronic shift register 31 if a stuck chip has not been properly removed. In such event, the electronic shift register 31, acting through its memory, will open the normally closed solenoid air valve 39 at the proper time in the cycle to admit air to the chamber 41 thereby ejecting the raw dough piece from the transfer roll 21 onto the scrap return conveyor 42. The particular raw dough piece that is ejected to prevent deposit on the lower carrier member 19 is one that will ultimately engage the upper carrier member 14 which has a stuck chip adhered thereto. In this way, build-up of additional layers of dough and fried chips is precluded as each carrier member is double checked on each cycle of the machine.

In a similar fashion, the lower carrier members 19 pass first beneath the electric photo sensor 25 to determine the presence of a stuck chip. In the event a stuck chip is detected, a signal is transmitted to the electronic shift register 31 which is immediately stored in the memory such that the solenoid valve 37 is opened at the proper time in the cycle when the stuck chip on the carrier 19 passes beneath the oil jet nozzle 34 allowing high pressure oil to be discharged to strip the stuck chip from the carrier member 19.

Thereupon the carrier member 19 passes the electric photo sensor 26 to determine whether the stuck chip has been removed. In the event it has not been removed, a signal is transmitted to the electronic shift register 31 whereupon the normally closed solenoid air valve 39 is opened at the appropriate time in the cycle in order to pressurize the chamber 41 and blow off the raw dough piece and prevent the deposit of a raw dough piece as the stuck chip passes beneath the transfer roll 21.

From the foregoing it will be apparent that the present method both detects and removes stuck chips from either of the upper or lower carrier members. Additionally, it prevents deposit of fresh raw dough pieces on the lower carrier member 19 in the event the high pessure oil jet is unable to remove the chip which occurs in only relatively very few instances. It will also be apparent that in operation of the method, if a chip should be stuck to such an extent that it is impossible to remove, this will be detected on every cycle of the machine such that additional deposit of raw dough will not be made on that carrier member.

While in the foregoing description, the machine has been described in the context of having but a single file of chip carriers in the path of travel of the endless chains 10 and 15, it will be apparent, of course, from an examination of the previously cited MacKendrick patent that multiple row chip carriers are commonly used in machines of this kind and it will be further apparent that the application of the method is in no way limited to the number of rows of chip carriers as a sufficient number of electric photo sensors and oil jet nozzles can be used to accommodate a machine of any size.

It will also be apparent that machine can be controlled such that the stuck chip carriers come to rest or are stopped beneath the oil jet nozzles whereupon the oil jet nozzles can be used to strip a stuck chip over a longer time interval. A suitable mechanism can also be provided to laterally traverse the jet nozzles over an entire row of carriers if such a mode of operation is desired. In other words, minor variations to the particular application of this control system will be apparent to those who are skilled in the art.

It will be noted that in the case of the upper carrier members 14, it is preferred that two oil jet nozzles 32 and 33 are used. This is because the upper carrier members are generally convex in configuration and it has been found that a pair of nozzles are preferred. For best results, it has been found preferable to mount the nozzles with the angle A equal to about 45° and the angle B equal to about 135°, respectively, with respect to the path of travel of the upper carrier members as measured from the path of travel on the upstream side of the upper carrier members. Similarly, removal of stuck chips from the lower carrier members 19 is readily obtained with a single oil jet nozzle 34 inasmuch as the generally concave nature of the carrier members 19 permits the use of a single nozzle to accomplish this end. In a preferred embodiment, the mounting angle C of the nozzle 34 for the lower carrier member is equal to about 105° with respect to the path of travel of the lower carrier member as measured from the path of travel on the upstream side of the lower carrier member.

The frying oil delivered from the pump 35 to the several nozzles upon opening of either of the valves 36 or 37, respectively, is at a very high pressure. The high pressure is maintained within practical limits with the lower limit being sufficient to remove a stuck chip and the upper limit being insufficient to cause damage to the chip carriers and associated elements of the machine. A pressure of about 1,000 p.s.i. is preferred to serve these dual purposes. It has also been found that good chip removal results are obtained when using nozzles 32, 33 and 34 having a bore of about ⅛ inch.

While in a preferred embodiment as previously discussed, it has been found that frying oil under high pressure is conveniently and preferably used to strip away stuck chips, it will, of course, be apparent that other kinds of fluid mediums might be used to achieve the same end. For example, in some instances it might be desirable and preferable to use steam under pressure in place of the oil nozzles. Similarly, in place of the electric photo sensor devices other types of sensors might be used such as mechanical elements which contact the surface of the carrier members 14 or 19, respectively, to sense any build-up of material thereon which would indicate a stuck chip. These and other variations and changes that might be applied to the basic control method of this invention will be apparent and obvious to persons of ordinary skill in the art and additional details and discussion thereof are deemed to be unnecessary for a full understanding thereof.

While particular embodiments of the invention have been illustrated and described, it will be obvious to those skilled in the art that various changes and modifications can be made without departing from the spirit and scope of the invention and it is intended to cover in the appended claims all such changes and modifications that are within the scope of this invention.

What is claimed as new is:

1. A method of detecting and removing stuck chips from a carrier of a chip frying machine comprising the steps of:
   (a) providing a first electric photo sensor in the path of movement of a plurality of chip carrier members,
   (b) detecting for the presence of a stuck chip on successive carrier members and transmitting a signal to a shift register upon sensing a stuck chip on a chip carrier,
   (c) controlling the discharge of a high pressure jet of oil from a nozzle by means of said shift register such that the high pressure oil jet is discharged against a stuck chip only during the interval of its passage beneath the nozzle to remove the stuck chip from said chip carrier,
   (d) detecting for the presence of a stuck chip with a second electric photo sensor in the path of movement of said chip carriers beyond the high pressure oil jet and transmitting a signal to said shift register upon sensing a stuck chip on a chip carrier, and
   (e) actuating a reject blowoff in a raw dough transfer device by means of said shift register to prevent a raw dough piece from being deposited on any chip carriers in which either member of a pair has a stuck chip clinging thereto.

2. A method as claimed in claim 1 including the step of mounting two oil jet nozzles for discharging oil against a stuck chip on an upper carrier member and aligning each of said nozzles in the plane of travel of said carrier member at an angle of about 45° and 135°, respectively, with respect to the path of travel of said upper carrier member as measured from the path of travel on the upstream side of said carrier member.

3. A method as claimed in claim 1 including the step of mounting one oil jet nozzle for discharging oil against a stuck chip on a lower carrier member and aligning said nozzle in the plane of travel of the lower carrier member at an angle of about 105° with respect to the path of travel of said lower carrier member as measured from the path of travel on the upstream side of said lower carrier member.

4. A method as claimed in claim 1 including the step of discharging frying oil from said nozzle at a pressure of at least about 1,000 p.s.i. for the purpose of removing said stuck chip.

5. A method as claimed in claim 2 including the step of discharging frying oil from said nozzle at a pressure of at least about 1,000 p.s.i. for the purpose of removing said stuck chip.

6. A method as claimed in claim 3 including the step of discharging frying oil from said nozzle at a pressure of at least about 1,000 p.s.i. for the purpose of removing said stuck chip.

References Cited
UNITED STATES PATENTS

| | | | |
|---|---|---|---|
| 3,608,474 | 9/1971 | Liepa | 99—404 |
| 3,576,647 | 4/1971 | Liepa | 99—100 P |
| 3,520,248 | 7/1970 | MacKendrick | 99—100 P |
| 3,349,905 | 10/1967 | Crawford | 250—223 R |
| 3,628,657 | 12/1971 | Billett | 250—223 R |

NORMAN YUDKOFF, Primary Examiner

H. H. BERNSTEIN, Assistant Examiner

U.S. Cl. X.R.

250—223; 99—338, 404